United States Patent [19]

Clearwater

[11] Patent Number: 5,530,520
[45] Date of Patent: Jun. 25, 1996

[54] METHOD OF ALLOCATING COPYRIGHT REVENUES ARISING FROM REPROGRAPHIC DEVICE USE

[75] Inventor: Scott H. Clearwater, Woodside, Calif.

[73] Assignee: Xerox Corporation, Stamford, Conn.

[21] Appl. No.: 356,993

[22] Filed: Dec. 15, 1994

[51] Int. Cl.$^6$ .................................................. G03G 21/00
[52] U.S. Cl. ........................... 355/201; 358/462; 377/15; 380/23; 380/51
[58] Field of Search ..................................... 355/201, 202; 377/13–15; 358/462, 467; 382/10, 34, 36, 317; 380/3, 23, 51

[56] References Cited

U.S. PATENT DOCUMENTS

| | | | |
|---|---|---|---|
| 3,759,611 | 9/1973 | O'Connell et al. | 355/43 |
| 4,173,408 | 11/1979 | Stewart | 355/202 X |
| 4,179,212 | 12/1979 | Lahr | 355/202 |
| 4,728,948 | 3/1988 | Fields | 340/825.06 |
| 4,728,984 | 3/1988 | Daniele | 355/201 X |
| 4,908,873 | 3/1990 | Philibert et al. | 382/34 |
| 5,299,026 | 3/1994 | Vincett et al. | 358/401 |
| 5,444,779 | 8/1995 | Daniele | 380/3 |

OTHER PUBLICATIONS

Garrett, J. R., Lyons, P. A., *Toward an Electronic Copyright Management System,* Journal of the American Society for Information Science. 1993 Sep.; 44(8):468–473.

Griswold, G. N., *A Method for Protecting Copyright on Networks,* Paper presented at the Joint Harvard MIT Workshop; 1993 Apr. 3.
German Patent Document DE 3422583 to Grunwald, Dec. 19, 1985 (Abstract).
Foreign Patent Document AU 8934825 to Middlemiss, Nov. 16, 1989 (Abstract).
German Patent Document DE 3025934 to Bantzer et al., Feb. 18, 1982 (Abstract).

*Primary Examiner*—William J. Royer
*Attorney, Agent, or Firm*—Tracy L. Hurt

[57] ABSTRACT

A copyright revenue allocation system that identifies copyrighted works after they are copied. Each copying service within the system informs a copyright revenue allocation service of each page or sheet it copies via document signals representing a portion of the copied document. The copyright revenue allocation service uses the document signals to determine whether the document copied is part of a copyrighted work, and, if so, identifies the owners of the intellectual property contained within that document. After identifying the intellectual property owners, the copyright revenue allocation system increments their associated revenue counters. These revenue counters are used to allocate copyright revenues from the copying services among the intellectual property owners entitled to compensation. Identifiers associated with the document signals identify the copying service copying the document, which allows the copyright revenue allocation system to track, record, and bill the fees owed by each copying service.

10 Claims, 3 Drawing Sheets

METHOD OF ALLOCATING COPYRIGHT REVENUES ARISING FROM REPROGRAPHIC DEVICE USE

FIELD OF THE INVENTION

The present invention relates to the capture of documents reproduced on a reprographic device. In particular, the present invention relates to the automatic allocation of copyright revenues arising from the reproduction of copyrighted documents via reprographic devices.

BACKGROUND OF THE INVENTION

Reprographic devices, such as photocopiers, electronic printers, digital copiers, and the like, represent a challenge to the authors and publishers of copyrighted works. Copyrighted material can be reproduced quickly, cheaply, and easily by reprographic devices without first obtaining permission to make the copies or compensating the copyright owner. Some copying services attempt to comply with copyright laws by obtaining permission to copy prior to reproducing copyrighted material. One common method of obtaining permission to copy copyrighted material is to call the publisher of the copyrighted work and request the desired permission. Permission may not be granted for hours or even days, which is unacceptable when time is an issue. Alternatively, some copying services seek a copyright license from a Reproductive Rights Organization (RRO), such as the Copyright Clearance Center (CCC). RROs license organizations other than copying services: schools, governments, and large private enterprises. RROs typically provide blanket licenses under which the licensee pays royalties to RRO for a period of years. During that term the licensee's copier usage is periodically surveyed by sampling. The RRO uses these surveys to determine the percentage of copyrighted materials copied as compared to the total number of copies made. That percentage is used to fix a per copy fee for the duration of the license. RROs also typically require licensees to track information regarding the bibliographic source and/or content of copyrighted material, and the type of work for sampled works so that individual authors and publishers can be compensated. This sampling process is cumbersome because much of it is manually implemented. Additionally, the sampling process does not accurately compensate authors and publishers. Automatic tracking of the number of copies made by a particular device reduces some of the disadvantages of a sampling system but copier users still need to manually identify the particular work being copied.

U.S. Pat. No. 4,179,212 to Lahr, assigned to Xerox Corporation, discloses a transaction accounting system for the automated royalty accounting of copyright-coded paper documents. The complete automated transaction accounting system includes a document copier and a copier access control system including a transaction data terminal for input of transaction information such as the date of the transaction, coded copyright information such as information contained in the ISSN/ISBN number, user identification and number of copies to be produced. A decoder is provided, the output of the decoder being connected to the transaction data terminal to input the document data. In accordance with this accounting system, a document being copied must be initially coded, at the time the paper is manufactured or printed, by application of special electrically conductive coatings to one or more areas of its surface, in order for the system to recognize the document as copyrighted. Further, the copier itself has to be provided with a suitable decoder in order to identify the copyright-coded document. Information about the bibliographic source of the document (such as the ISBN/ISSN number) is either coded into the document, or must be input by the user, either by scanning a special bar code imprinted on the document or by keyboard entry. The system cannot be used with any document which does not have the special conductive coating, so is not applicable to the great majority of published and copyrighted documents. The, system would be difficult to use with a plurality of different reprographic devices, since it requires a special document platen to sense the paper conductivity; this would make it difficult to economically install such a device for brief consecutive sample periods on many existing reprographic devices. Further, the system is manual in nature when a bar code is not applied to the document. Finally, identifying the author of a particular copied portion of a publication, such as a magazine article, is difficult, as is the categorization of the content of the portion (such as prose versus poetry versus music, or the proportion of photographic material), because most bar code schemes only identify an entire publication.

U.S. Pat. No. 4,728,984 to Daniele, assigned to Xerox Corporation, discloses a data handling and archiving system. The system first transfers a document image into digital signals and then stores the image in memory for later retrieval. An electronic printer having an image input scanner is used for scanning the documents. The printer is equipped with a recognition circuit that reads a bar or other code on the document to distinguish encoded documents from other non-coded documents. The system does not track the copying of certain documents but rather reads the special coded digital images previously placed on the input document, decodes said images and either prints a message based on their content or uses their content as auxiliary software to control the printer operation.

Copyrighted material in electronic form offers numerous possibilities for encoding, encryption, and adding marking subsequent to publication to protect copyrighted material from unauthorized copying. Unfortunately, methods of protecting electronic versions of copyrighted material do not address the copying of hardcopy copyrighted material subsequent to publication.

Despite efforts to protect copyrighted works the International Copyright Information Center estimates annual loss of $15 Billion in revenue caused by unauthorized copying of copyrighted material.

SUMMARY OF THE INVENTION

A copyright revenue allocation system is described that identifies copyrighted works after they are copied. Each copying service within the system informs a copyright revenue allocation service of each page or sheet it copies via document signals representing the copied document. The copyright revenue allocation service uses the document signals to determine whether the document copied is part of a copyrighted work, and, if so, identifies the owners of the copyrighted material. After identifying the copyright owners, the copyright revenue allocation system increments their associated revenue counters. These revenue counters are used to allocate copyright revenues from the copying services among copyright owners entitled to compensation. Identifiers associated with the document signals also identify the reprographic device that made the copy, which allows the copyright revenue allocation system to track and record the fees owed by each copying service.

Other objects, features, and advantages of the present invention will be apparent from the accompanying drawings and detailed description that follows.

BRIEF DESCRIPTION OF THE DRAWINGS

The present invention is illustrated by way of example and not by way of limitation in the figures of the accompanying drawings. In the accompanying drawings similar references indicate similar elements.

DETAILED DESCRIPTION OF THE PREFERRED EMBODIMENTS

Figure 1:
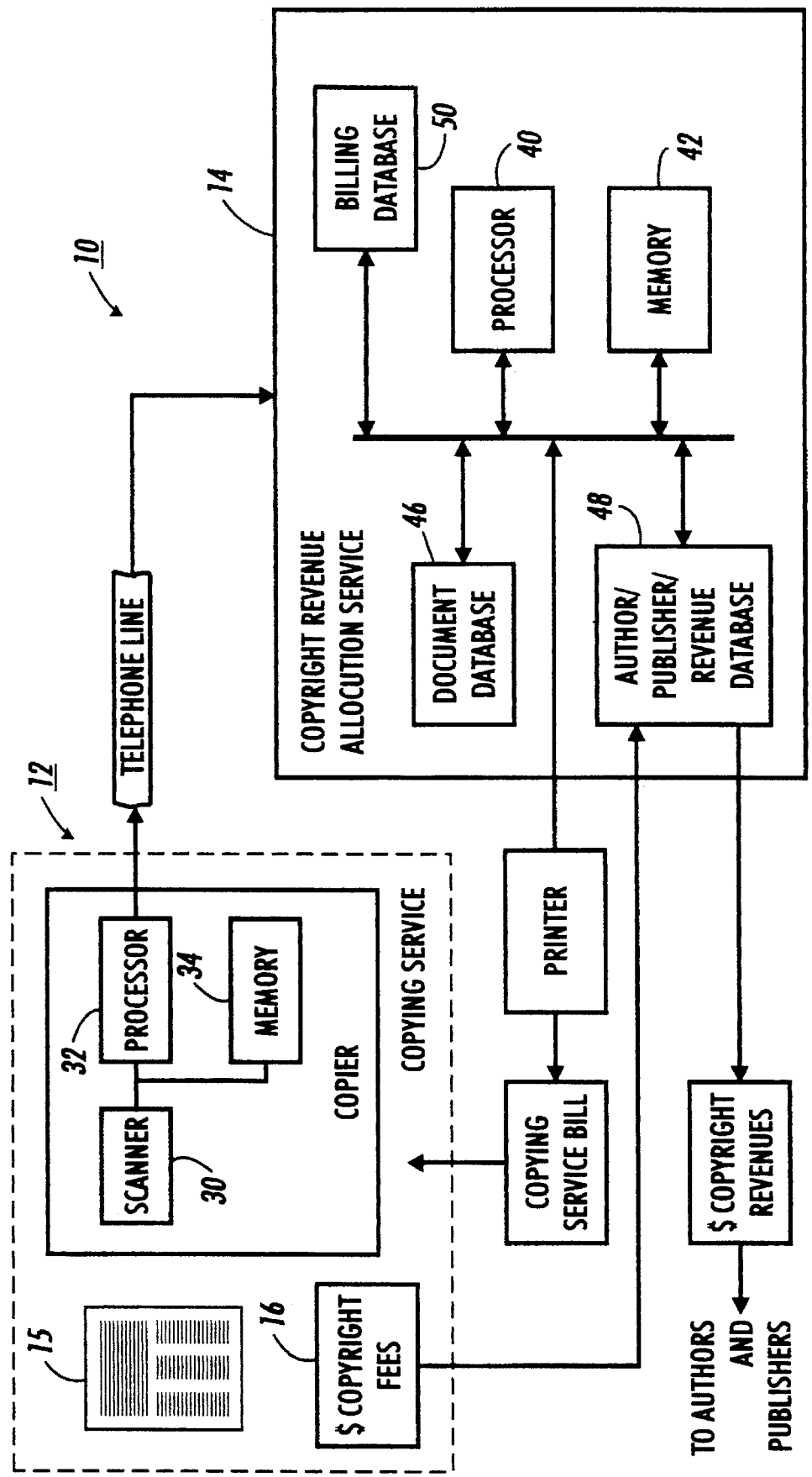
FIG. 1 is a block diagram of a copyright revenue allocation system.

FIG. 1 illustrates copyright revenue allocation system 10 of the present invention. Briefly described, copyright revenue allocation system 10 identifies copyrighted works as they are being copied and identifies the author and publisher entitled to compensation as a result of the copying. Copyright revenue allocation system 10 relies upon the coupling and cooperation between copying services 12 and copyright revenue allocation service 14 to perform its function. Each copying service 12 informs copyright revenue allocation service 14 of each page or sheet it copies. Copyright revenue allocation service 14 uses that information to determine whether the sheet copied is part of a copyrighted work, and, if so, to identify the author and publisher entitled to compensation as a result. This information can then be used to bill copying services 12 for the copying of copyrighted works. The copyright revenue allocation service 14 allocates copyright revenues received from copying services 12 to those authors and publishers entitled to compensation, as indicated by revenue counters.

Copyright revenue allocation system 10 offers a number of advantages as compared to prior methods of generating revenue from copyrighted works. Copyright revenue allocation system 10 is fast because communication between copying services 12 and copyright revenue allocation service 14 occurs automatically without any need to request permission to make copies or manually record information about the document. Copyright revenue allocation system 10 can be implemented without effecting the cost per copy to the customer making the copies. Copyright revenue allocation system 10 is attractive to copying services because it eliminates the need for operators to obtain copy authorization, while simultaneously preventing copyright infringement for which they could be liable.

A more detailed discussion of the operation of copyright revenue allocation system 10 is aided by further discussion of copying services 12 and copyright revenue allocation service 14. Each copying service 12 makes one or more reprographic devices 16 or copiers 16 available to the public for a fee per page copied. Each reprographic device 16 includes a scanner 30 that scans each page 15, or sheet 15, while it is being copied and generates electronic signals representing an image of page 15. Scanner 30 couples document signals to processor 32 to generate revised document signals. The revised document signals include identifiers that identify the particular copying service 12 and, optionally, identify the copier 16 on which the document was copied. Preferably, processor 32 revises the document signals to reduce the information exchanged with copyright revenue allocation service 14. Processor 32 analyzes the document signals and extracts the most relevant information. Relevant portions of each page include the first few inches at the top of the page and last few inches of a page. These areas of a document page are likely to include information that identifies a copyrighted work, such as title, author, publisher, copyright notice, ISBN, Copyright Clearance Center number, bar codes, glyphs, etc. After generating the revised document signals, processor 32 automatically faxes the revised document signals to copyright revenue allocation service 14 via telephone line 18.

Processor 32 performs its tasks by executing instructions stored with memory 34. Memory 34 can be realized using solid state memory devices such as read only memories (ROM), random access memories (RAM), dynamic random access memories (DRAM), programmable read only memories (PROM), erasable programmable read only memories (EPROM), and electrically erasable programmable read only memories (EEPROM), such as flash memories.

Reprographic devices 16 may include a user operated switch permitting users to prevent the transmission of personal and private documents to copyright revenue allocation service 14. The switch default position should be transmission.

Copyright revenue allocation service 14 analyzes revised document signals to determine whether a copyrighted work has been copied and, if so, to identify the publisher and authors entitled to compensation when a particular copyrighted work is copied. Additionally, copyright revenue allocation service 14 uses revised document signals to track the fees owed by copying services 12 and to bill the copying services 12. Copyright revenue allocation service 14 then allocates to the appropriate authors and publishers the copyright revenues generated by fees paid by copying services 12.

Copyright revenue allocation services 14 performs its tasks using a number of databases coupled to processor 40 and memory 42. Memory 42 can be realized using solid state memory devices such as read only memories (ROM), random access memories (RAM), dynamic random access memories (DRAM), programmable read only memories (PROM), erasable programmable read only memories (EPROM), and electrically erasable programmable read only memories (EEPROM), such as flash memories.

Figure 2:
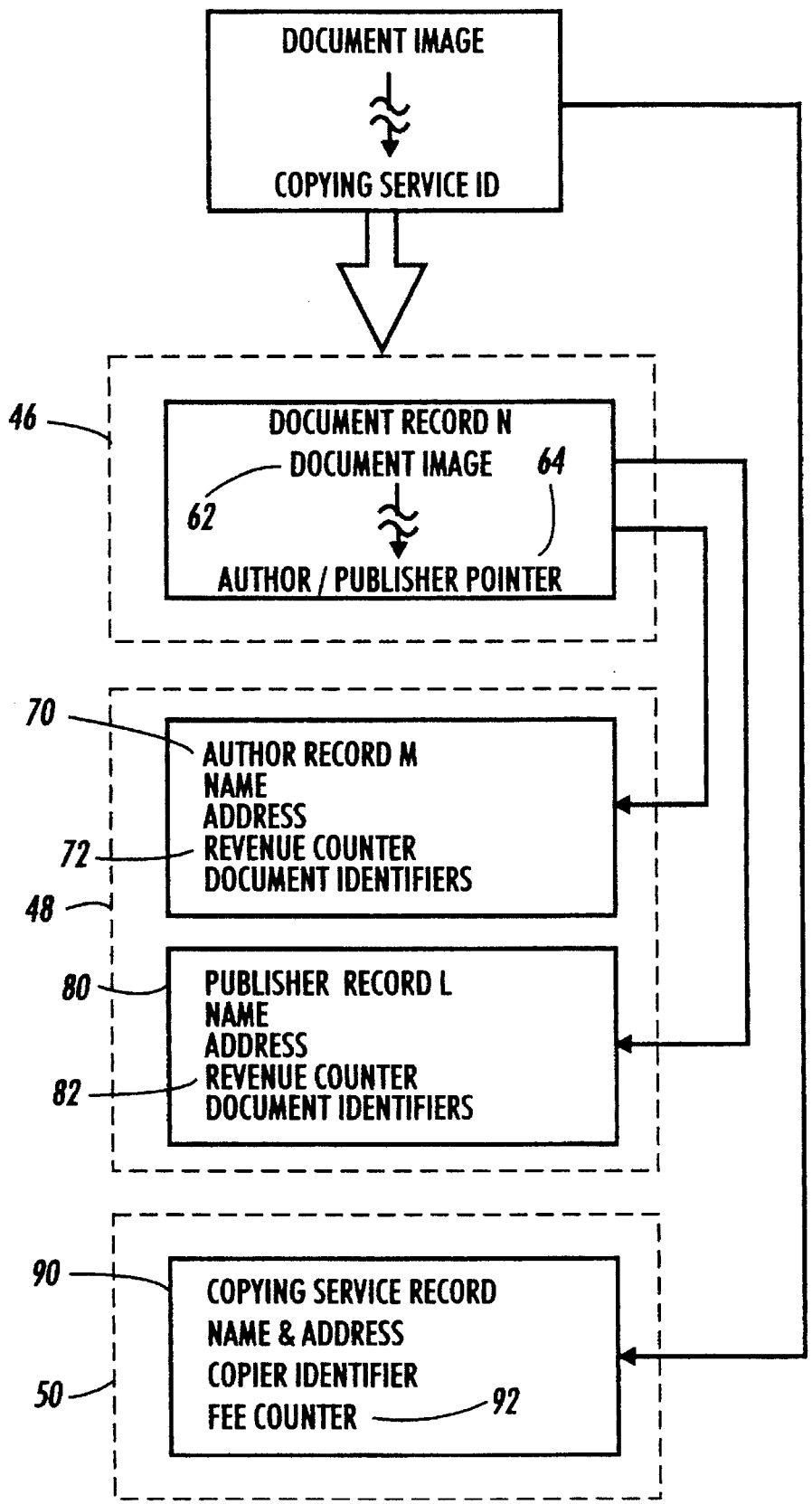
FIG. 2 illustrates exemplary records included within the document database, the author/publisher/revenue database, and the billing database.

Databases within copyright revenue allocation service 14 include document database 46, author/publisher/revenue database 48, and billing database 50. For each entity relevant to it, each database includes an associated record. FIG. 2 illustrates symbolically the type of information included in the records maintained by databases 46, 48, and 50. Document database 46 maintains a document record 60 for each copyrighted work within database 46. Each document record 60 includes a document image 62, a representation of each page of a particular copyrighted work. Each document record 60 includes author and publisher pointers 64, which point to the author(s) and publisher associated with that copyrighted work. Document database 46 is most conveniently created by having each publishing house participating in system 10 provide a document record 60 for each copyrighted work it has published whose copyright is unexpired. Thereafter, document records 46 would be added to document database 46 by publishing houses as they publish copyrighted works. However, nothing prevents document records from being added to document database 46 subsequent to publication. Author/publisher/revenue database 48 includes both author records 70 and publisher records 80. Each author record 70 includes the name and address of an author of a copyrighted word included within document database 46. Additionally, each author record includes a revenue counter 72. The revenue counter 72 indicates the number of copies of an author's work that have been made within some time period for which compensation is due. Copyright revenue allocation service 14 uses the revenue counter 72 to calculate the copyright revenues to which the author is entitled. Author record 70 may also include document identifiers to indicate those copyrighted works included within the document database the author authored. Publisher records 80 maintain similar information about publishers. Each publisher record 80 includes the name and address of a publisher of a work or works included within document database 46. Each publisher record 80 also includes a revenue counter 82 that indicates the number of copies of a publisher's work that have been made within some time period for which compensation is due. Copyright revenue allocation service 14 uses the revenue counter 82 to calculate the copyright revenues to which the publisher is entitled. Publisher record 80 may also include document identifiers to indicate those copyrighted works included within the document database the publisher published. The last database, billing database 50, includes a record 90 for each copying service 12 participating in copyright revenue allocation system 10. Each copying service record 90 includes the name and address of a copying service, identifiers of the copying service's copiers, as well a fee counter 92. The fee counter 92 indicates the number of copies of copyrighted works made by the copying services for which compensation is owed.

Those skilled in the art will understand that copyright revenue allocation service 14 need not include three separate databases. Copyright revenue service 14 may be realized using a single database and a single type of record. Doing so modifies searching of the database to identify whether a copyrighted work has been copied and to generate copyright revenue payments and bills in a manner obvious to one of ordinary skill in the art.

Figure 3:
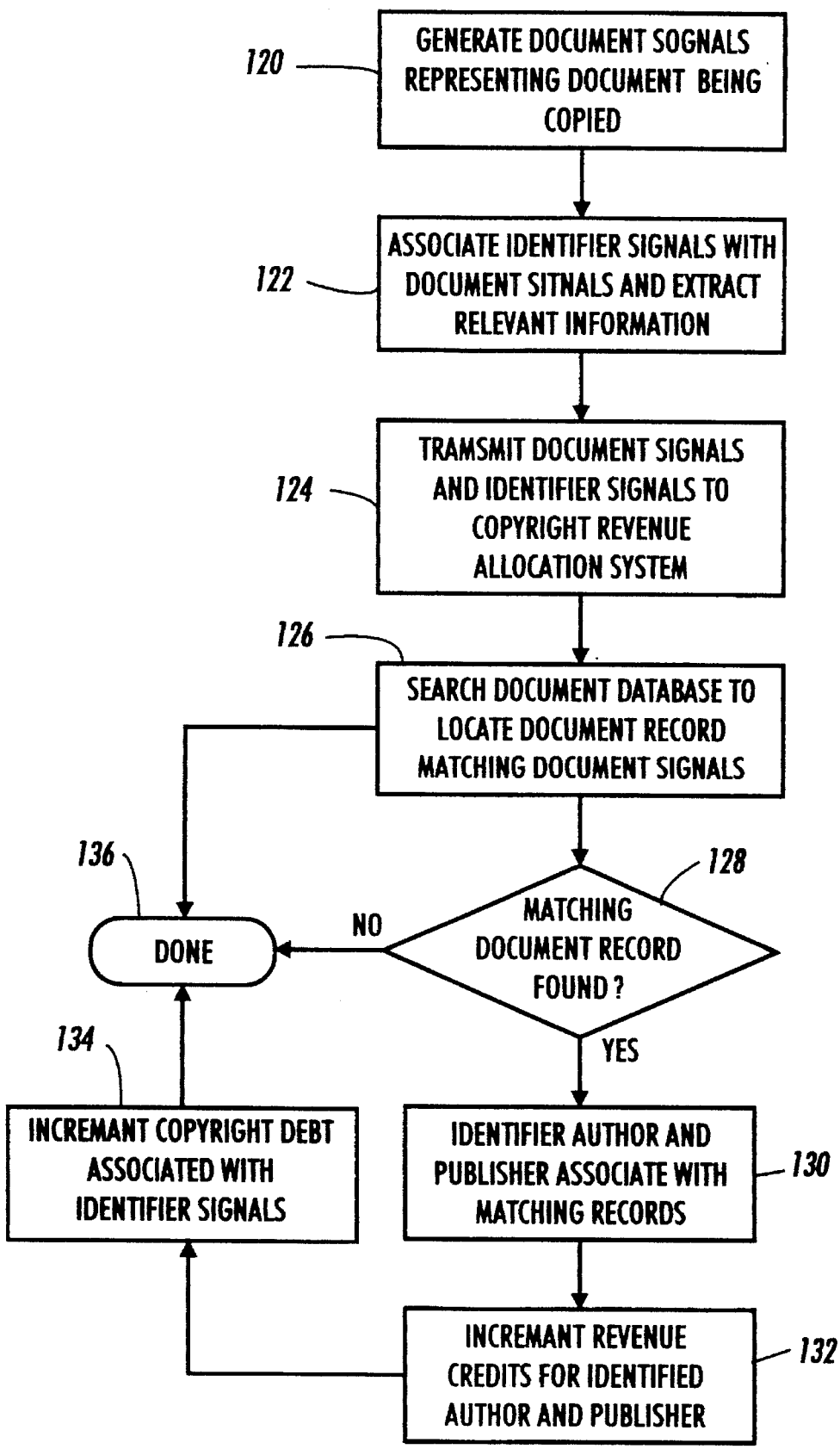
FIG. 3 is a flow diagram of the method used by the copyright revenue allocation system to respond to the copying of a page.

The response of copyright revenue allocation system 10 to the copying of a page is illustrated by the flow diagram of FIG. 3. Whenever a copy is made by a copier 16 document signals are automatically generated, as indicated by step 120. The document signals are then coupled to the copier's processor 32. During step 122 processor 32 generates revised document signals by associating identifiers with the document signals and extracting the most relevant information from the document signals. Afterward, during step 124, processor 32 automatically faxes the revised document signals to copyright revenue allocation service 14.

Upon receipt of the revised document signals at copyright revenue allocation service 14, processor 40 searches document database 46. During step 126 processor 40 searches for a document record 60 including a document image 62 matching that included within revised document signals. If no such document record 60 can be found, processor 40 branches to step 136 from step 128, its task complete. If document database 46 includes document records for most copyrighted works, then failure to find a matching record will occur mostly when the document represented by the revised document signals is not copyrighted. On the other hand, if processor 40 does find a document record including information matching that represented by the revised document signals, then processor 40 branches to step 130 from step 128.

During step 130 processor 40 uses the author and publisher pointers 64 included within the matching record to identify the author entitled to compensation. That is to say, processor 40 identifies an author record 70 and a publisher record 80 during step 130. Subsequently, during step 132 processor 40 increments revenue counters 72 and 82 included within the just located author record 70 and publisher record 80. Next, during step 134, processor 40 uses the identifier signals included within the revised document signals to determine which copying service 12 to bill for the copying of a copyrighted work. In other words, processor 40 identifies a copying service record 90 that includes the copier identifier of the revised document signals during step 134 and increments its fee counter 92. That done, processor 40 branches to step 136 from step 134 to await receipt of another set of revised document signals.

In the foregoing specification, the invention has been described with reference to specific exemplary embodiments thereof. It will, however, be evident that various modifications and changes may be made thereto without departing from the broader spirit and scope of the invention as set forth in the appended claims. Accordingly, the specification and drawings are to be regarded in an illustrative rather than a restrictive sense.

What is claimed is:

1. A method of allocating revenues arising from the copying of a document using a reprographic device, the reprographic device including a scanner for generating document signals representing the document, the method including the steps of:
   a) generating document signals representing the document;
   b) comparing the document signals to a document database including a multiplicity of document records, each document record uniquely identifying an associated document by representing a portion of the associated document, each document included in the document database having an owner;
   c) if the document signals match a document record of the document database;
      1) identifying an owner associated with the document record;
      2) incrementing a revenue counter associated with the owner.

2. The method of claim 1 wherein the document signals further include identifier signals identifying the reprographic device.

3. The method of claim 2 further comprising the steps of:
   d) comparing the identifier signals to a billing database including a multiplicity of reprographic device records, each reprographic device record identifying a reprographic device and having an associated fee counter;
   e) if the document signals match a document record of the document database and the identifier signals match a reprographic device record, incrementing the fee counter.

4. A method of allocating revenues arising from the copying of a copyrighted document using a reprographic device, the reprographic device including a scanner for generating document signals representing a portion of a document being copied, the method including the steps of:
   a) generating document signals representing a portion of a document being copied;
   b) comparing the document signals to a document database including a multiplicity of document records, each document record uniquely identifying an associated document by representing a portion of the associated copyrighted document, each copyrighted document included in the document database having an associated publisher and an associated author;

c) if the document signals match a portion of a document record of the document database;
   1) identifying a publisher and an author associated with the document record;
   2) incrementing a revenue counter associated with the author; and
   3) incrementing a revenue counter associated with the publisher.

5. The method of claim 4 further comprising the steps of:

d) comparing the identifier signals to a billing database including a multiplicity of reprographic device records, each reprographic device record identifying a reprographic device and having an associated fee counter;

e) if the document signals match a document record of the document database and the identifier signals match a reprographic device record, incrementing the fee counter.

6. The method of claim 4 wherein the document signals represent only a portion of the document extending from a top of the document.

7. The method of claim 4 wherein the document signals further include identifier signals identifying the reprographic device.

8. The method of claim 7 wherein the document signals represent only a portion of the document extending from a bottom of the document.

9. The method of claim 7 wherein the document signals represent less than all of the document and represent a portion of the document extending from a bottom of the document and another portion of the document extending from a top of the document.

10. A method of allocating revenues arising from the copying of a copyrighted document using a reprographic device, the reprographic device including a scanner for generating document signals representing a document being copied, the method including the steps of:

a) generating document signals representing a document being copied;

b) extracting relevant portions of the document from the document signals to generate revised document signals;

c) associating with the revised document signals an identifier identifying the reprographic device;

d) transmitting the revised document signals to a center;

e) comparing the document signals to a document database within the center, the center including a multiplicity of document records, each document record uniquely identifying an associated copyrighted document by representing a portion of the associated copyrighted document, each copyrighted document included in the document database having an associated publisher and an associated author;

f) if the revised document signals match a portion of a document record of the document database;
   1) identifying a publisher and a author associated with the document record;
   2) incrementing a revenue counter associated with the author; and
   3) incrementing a revenue counter associated with the publisher.

* * * * *